United States Patent
Sugimura

(10) Patent No.: US 10,414,835 B2
(45) Date of Patent: Sep. 17, 2019

(54) METHOD OF PRODUCTION OF MODIFIED CONJUGATED DIENE RUBBER

(71) Applicant: ZEON CORPORATION, Tokyo (JP)

(72) Inventor: Takeshi Sugimura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 138 days.

(21) Appl. No.: 15/553,295

(22) PCT Filed: Feb. 25, 2016

(86) PCT No.: PCT/JP2016/055662
§ 371 (c)(1),
(2) Date: Aug. 24, 2017

(87) PCT Pub. No.: WO2016/136889
PCT Pub. Date: Sep. 1, 2016

(65) Prior Publication Data
US 2018/0016362 A1    Jan. 18, 2018

(30) Foreign Application Priority Data

Feb. 26, 2015   (JP) ................. 2015-036855

(51) Int. Cl.
| | | |
|---|---|---|
| C08C 19/42 | (2006.01) |
| C08L 15/00 | (2006.01) |
| C08K 3/36 | (2006.01) |
| B60C 11/00 | (2006.01) |
| B60C 1/00 | (2006.01) |
| C08F 36/00 | (2006.01) |
| C08C 19/25 | (2006.01) |
| C08F 4/46 | (2006.01) |
| C08K 3/011 | (2018.01) |
| C08F 36/04 | (2006.01) |
| C08K 3/20 | (2006.01) |
| C08C 19/32 | (2006.01) |
| C08C 19/44 | (2006.01) |

(52) U.S. Cl.
CPC ............... *C08C 19/42* (2013.01); *B60C 1/00* (2013.01); *B60C 11/00* (2013.01); *C08C 19/25* (2013.01); *C08C 19/32* (2013.01); *C08C 19/44* (2013.01); *C08F 4/46* (2013.01); *C08F 36/00* (2013.01); *C08F 36/04* (2013.01); *C08K 3/011* (2018.01); *C08K 3/20* (2013.01); *C08K 3/36* (2013.01); *C08L 15/00* (2013.01)

(58) Field of Classification Search
CPC ...................................................... C08C 19/42
See application file for complete search history.

(56) References Cited

U.S. PATENT DOCUMENTS

| | | | |
|---|---|---|---|
| 2012/0071603 A1 | 3/2012 | Hayano et al. |
| 2014/0011909 A1 | 1/2014 | Satou et al. |
| 2014/0364559 A1 | 12/2014 | Sugimura et al. |

FOREIGN PATENT DOCUMENTS

| | | |
|---|---|---|
| CN | 103237841 A | 8/2013 |
| CN | 104011081 A | 8/2014 |
| JP | 2012-241112 A | 12/2012 |
| WO | 2010/131646 A1 | 11/2010 |

OTHER PUBLICATIONS

Machine translation of JP2013/245247 (Year: 2013).*
Oct. 29, 2018 Extended Search Report issued in European Patent Application No. 16755633.1.
May 17, 2016 International Search Report issued in International Patent Application No. PCT/JP2016/055662.

* cited by examiner

Primary Examiner — Wenwen Cai
(74) Attorney, Agent, or Firm — Oliff PLC

(57) ABSTRACT

A method of production of modified conjugated diene rubber includes causing an aromatic compound having three or more carbon atoms directly bonded to an aromatic ring in one molecule to react with an alkali metal atom so as to obtain an alkali metal-reacted aromatic compound; polymerizing a monomer at least containing a conjugated diene compound by using the alkali metal-reacted aromatic compound so as to obtain a conjugated diene rubber having an active end; causing the active end of the conjugated diene rubber having an active end to react with an activity control agent so as to obtain a conjugated diene rubber reacted with an activity control agent; and causing the active end of the conjugated diene rubber reacted with an activity control agent to react with a modifier having an alkoxy group and a halogen atom-containing group so as to obtain a modified conjugated diene rubber.

9 Claims, No Drawings

METHOD OF PRODUCTION OF MODIFIED CONJUGATED DIENE RUBBER

TECHNICAL FIELD

The present invention relates to a method of production of a modified conjugated diene rubber, and more particularly relates to a method for producing a modified conjugated diene rubber which is excellent in processability and can give a cross-linked rubber excellent in tensile strength, elongation at break, low heat buildup property and wet grip property. Furthermore, the present invention relates to a modified conjugated diene rubber obtained by this method of production, a rubber composition containing the modified conjugated diene rubber, and a cross-linked rubber obtained therefrom.

BACKGROUND ART

Due to environmental problems and resource problems, also in tires for vehicles, low heat buildup property is strongly required in recent years. A tire obtained by using a rubber composition in which silica is mixed is more excellent in the low heat buildup property than a tire obtained by using a rubber composition in which usually used carbon black is mixed, and therefore, a fuel efficient tire can be produced by using this composition. On the other hand, even if usually used rubber is mixed with silica, the rubber is poor in the affinity with silica and hence is easily separated, and as a result, it is apprehended that the fuel efficiency may be degraded.

For such a rubber composition, there is a known art, to be employed for improving the affinity between the rubber and silica, in which a functional group having high affinity with silica is introduced by reacting a polymerization active end or the like of the rubber with a modifier.

For example, Patent Document 1 discloses a method of production of a radial conjugated diene polymer which comprises polymerizing a monomer mixture containing at least a conjugated diene compound by using, as a polymerization initiator, an alkali metal-reacted aromatic compound having three or more carbon atoms directly bonded to an alkali metal atom and an aromatic ring in one molecule. In Patent Document 1, since the conjugated diene polymer has a radical structure, if a filler such as silica is added thereto, the affinity with the filler can be improved so that low heat buildup property and abrasion resistance can be improved. Furthermore, in the art described in Patent Document 1, the radical conjugated diene polymer is further improved in the low heat buildup property by using a modifier having an alkoxy group, but gelation (three-dimensional cross-linking) is caused in the art of Patent Document 1 by the modification reaction unless a modification point is adjusted, which causes a problem of inferior processability, and therefore, there are demands for further improvement.

PRIOR ART DOCUMENTS

Patent Documents

Patent Document 1: International Publication WO2010/131646A

SUMMARY OF THE INVENTION

Problem to be Solved by the Invention

The present invention was made in consideration of this actual situation, and an object is to provide a method for producing a modified conjugated diene rubber which is excellent in processability and can give a cross-linked rubber excellent in tensile strength, elongation at break, low heat buildup property and wet grip property.

Means for Solving the Problem

The present inventor engaged in intensive research for achieving the above-described object, and as a result discovered the following to accomplish the present invention: If a monomer containing at least a conjugated diene compound is polymerized by using, as a polymerization initiator, an alkali metal-reacted aromatic compound obtained by reacting, with an alkali metal atom, an aromatic compound having three or more carbon atoms directly bonded to an aromatic ring in one molecule; and an active end of the thus obtained conjugated diene rubber is reacted with an activity control agent, and then is reacted with a prescribed modifier, a modified conjugated diene rubber which is excellent in processability and can give cross-linked rubber excellent in tensile strength, elongation at break, low heat buildup property and wet grip property can be obtained.

Specifically, the present invention provides a method of production of a modified conjugated diene rubber, comprising: a first step of causing an aromatic compound having three or more carbon atoms directly bonded to an aromatic ring in one molecule to react with an alkali metal atom so as to obtain an alkali metal-reacted aromatic compound; a second step of polymerizing a monomer at least containing a conjugated diene compound by using the alkali metal-reacted aromatic compound so as to obtain a conjugated diene rubber having an active end; a third step of causing the active end of the conjugated diene rubber having an active end to react with an activity control agent so as to obtain a conjugated diene rubber reacted with an activity control agent; and a fourth step of causing the active end of the conjugated diene rubber reacted with an activity control agent to react with a modifier having an alkoxy group and a halogen atom-containing group so as to obtain a modified conjugated diene rubber.

In the method of production of the present invention, the aromatic compound having three or more carbon atoms directly bonded to an aromatic ring in one molecule is preferably a compound represented by the following general formula (1):

wherein, in the general formula (1), each of $R^1$ to $R^8$ represents a hydrogen atom or a $C_1$ to $C_{10}$ alkyl group, and three or more of $R^1$ to $R^8$ are a $C_1$ to $C_{10}$ alkyl group; and "m" is an integer of 0 to 5, and when "m" is 2 or more, three or more benzene rings present therein may be condensed with one another in arbitrary position regardless of the structure represented by the general formula (1).

In the production method of the present invention, the modifier is preferably a compound represented by the following general formula (2):

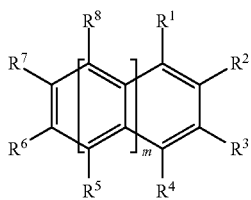

(1)

wherein, in the general formula (2), $X^1$ represents a group represented by $X^2$ or $R^{11}X^2$ (wherein $X^2$ represents a halogen atom, and $R^{11}$ represents a $C_1$ to $C_4$ alkylene group); each of $R^9$ and $R^{10}$ independently represents a $C_1$ to $C_{10}$ alkyl group; and "n" is an integer of 1 to 3.

In the method of the present invention, the activity control agent is preferably a compound represented by the following general formula (3) and/or (4), and is more preferably ethylene oxide and/or propylene oxide:

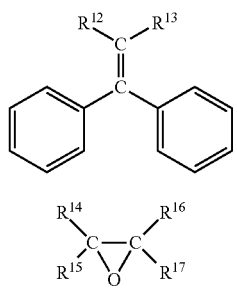

wherein each of $R^{12}$ and $R^{13}$ in the general formula (3) independently represents a hydrogen atom or a $C_1$ to $C_{10}$ alkyl group; and each of $R^{14}$ to $R^{17}$ in the general formula (4) independently represents a hydrogen atom or a $C_1$ to $C_{12}$ alkyl group.

Besides, the present invention provides a modified conjugated diene rubber obtained by any of the above-described methods of production.

Furthermore, the present invention provides a rubber composition comprising 100 parts by weight of a rubber ingredient containing the above-described modified conjugated diene rubber and 10 to 200 parts by weight of silica.

The rubber composition of the present invention preferably further comprises a cross-linking agent.

Besides, the present invention provides a cross-linked rubber obtained by cross-linking the above-described rubber composition, and a tire comprising the cross-linked rubber.

Effects of the Invention

According to the present invention, it is possible to provide a modified conjugated diene rubber which is excellent in processability and can give a cross-linked rubber excellent in tensile strength, elongation at break, low heat buildup property and wet grip property, a rubber composition containing the modified conjugated diene rubber, and a cross-linked rubber which is obtained by using the rubber composition and is excellent in tensile strength, elongation at break, low heat buildup property and wet grip property.

DESCRIPTION OF EMBODIMENTS

<Method of Production of Modified Conjugated Diene Rubber>

A method of production of modified conjugated diene rubber of the present invention comprises: a first step of causing an aromatic compound having three or more carbon atoms directly bonded to an aromatic ring in one molecule to react with an alkali metal atom so as to obtain an alkali metal-reacted aromatic compound; a second step of polymerizing a monomer containing at least a conjugated diene compound by using the alkali metal-reacted aromatic compound so as to obtain a conjugated diene rubber having an active end; a third step of causing the active end of the conjugated diene rubber having an active end to react with an activity control agent so as to obtain a conjugated diene rubber reacted with an activity control agent; and a fourth step of causing the active end of the conjugated diene rubber reacted with an activity control agent to react with a modifier having an alkoxy group and a halogen atom-containing group so as to obtain a modified conjugated diene rubber.

<First Step>

First, the first step of the method of production of the present invention will be described. The first step performed in the method of production of the present invention is a step of causing an aromatic compound having three or more carbon atoms directly bonded to an aromatic ring in one molecule to react with an alkali metal atom so as to obtain an alkali metal-reacted aromatic compound. Note that, the alkali metal-reacted aromatic compound obtained in the first step is used as a polymerization initiator in the second step described later.

The aromatic ring constituting the aromatic compound having three or more carbon atoms directly bonded to an aromatic ring in one molecule is not particularly limited as long as it is a conjugated ring having aromaticity, and specific examples include electrically neutral aromatic hydrocarbon rings such as a benzene ring, naphthalene ring and anthracene ring; negatively charged aromatic hydrocarbon rings such as a cyclopentadienyl anion ring, indenyl anion ring and fluorenyl anion ring; and aromatic rings having a hetero atom such as a furan ring and thiophene ring. Among these rings, from the viewpoint of stability and polymerization activity, an electrically neutral aromatic hydrocarbon ring is preferred, and a benzene ring is particularly preferred.

Examples of such an aromatic compound having three or more carbon atoms directly bonded to an aromatic ring in one molecule include an aromatic compound represented by the following general formula (1) and an aromatic compound represented by the following general formula (5), and among these compounds, an aromatic compound represented by the general formula (1) is preferred.

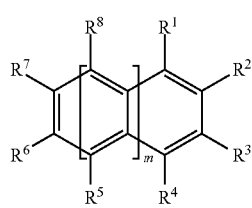

(1)

In the general formula (1), each of $R^1$ to $R^8$ independently represents a hydrogen atom or a $C_1$ to $C_{10}$ alkyl group, and three or more of $R^1$ to $R^8$ are a $C_1$ to $C_{10}$ alkyl group. Besides, "m" is an integer of 0 to 5, and when "m" is 2 or more, three or more benzene rings present therein may be condensed with one another in arbitrary position regardless of the structure represented by the general formula (1). Note that, the tam "independently" means that when "m" is, for example, 2 or more, each of $R^5$ and $R^8$ is present in plural number, and these plural $R^5$ or $R^8$ may be the same as or different from each other.

Preferably, in the general formula (1), "m" represents 0, three of $R^1$, $R^2$, $R^3$, $R^4$, $R^6$ and $R^7$ are a $C_1$ to $C_{10}$ alkyl group, and the remainder of $R^1$, $R^2$, $R^3$, $R^4$, $R^6$ and $R^7$ are a hydrogen atom.

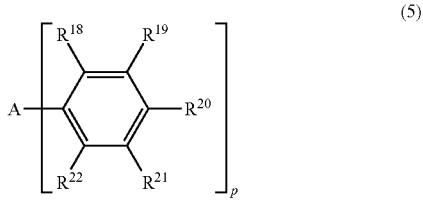

(5)

In the general formula (5), each of $R^{18}$ to $R^{22}$ independently represents a hydrogen atom or a $C_1$ to $C_{10}$ alkyl group, and one or more of $R^{18}$ to $R^{22}$ represent a $C_1$ to $C_{10}$ alkyl group. Besides, "A" represents an optional linking group, and "p" is an integer of 3 to 100. Note that, the term "independently" means that if "p" is, for example, 3 or more, each of $R^{16}$ and $R^{22}$ is present in plural number, and these plural $R^{18}$, $R^{19}$, $R^{20}$, $R^{21}$ or $R^{22}$ may be the same as or different from one another.

Specific examples of the aromatic compounds represented by the general formula (1) include benzenes having three or more alkyl groups, such as 1,2,3-trimethylbenzene, 1,2,4-trimethylbenzene, 1,3,5-trimethylbenzene, hexamethylbenzene, 1,2,3-triethylbenzene, 1,2,4-triethylbenzene, 1,3,5-triethylbenzene, 1,2,3-tripropylbenzene, 1,2,4-tripropylbenzene, 1,3,5-tripropylbenzene, 1,3,5-tributylbenzene and 1,3,5-tripentylbenzene; and naphthalenes having three or more alkyl groups, such as 2,3,5-trimethylnaphthalene and 1,4,5-trimethylnaphthalene.

Besides, specific examples of the aromatic compound represented by the general formula (5) include styrene polymers in which one or more hydrogen on a benzene ring is substituted by an alkyl group, such as an o-methylstyrene oligomer, m-methylstyrene oligomer, p-methylstyrene oligomer, p-ethylstyrene oligomer, p-propylstyrene oligomer, p-butylstyrene oligomer and p-pentylstyrene oligomer.

In the method of production of the present invention, the alkali metal atom to be reacted with the aromatic compound having three or more carbon atoms directly bonded to an aromatic ring in one molecule is not particularly limited, and is preferably lithium, sodium or potassium, and among these, is particularly preferably lithium. Besides, a method for reacting, with the alkali metal atom, the aromatic compound having three or more carbon atoms directly bonded to an aromatic ring in one molecule is not particularly limited, and a method in which an organic alkali metal compound is reacted in an inert solvent under inert atmosphere is suitably employed.

The organic alkali metal compound is not particularly limited, an alkali metal compound having an alkyl group or an aryl group is suitably used, and specific examples include methyllithium, methylsodium, methylpotassium, ethyllithium, ethylsodium, ethylpotassium, n-propyllithium, isopropylpotassium, n-butyllithium, s-butyllithium, t-butyllithium, n-butylsodium, n-butylpotassium, n-pentyllithium, n-amyllithium, n-octyllithium, phenyllithium, naphthyllithium, phenylsodium and naphthylsodium. Among these compounds, an alkali metal compound having an alkyl group is preferred, a lithium compound having an alkyl group is more preferred, and n-butyllithium is particularly preferred. The amount of the organic alkali metal compound to be used with respect to the aromatic compound having three or more carbon atoms directly bonded to an aromatic ring in one molecule is not particularly limited, and is usually 0.1 to 100 moles, preferably 0.2 to 50 moles, more preferably 0.3 to 10 moles, and particularly preferably 0.3 to 1.1 moles with respect to 1 mole of the carbon atoms directly bonded to the aromatic ring in the aromatic compound.

Besides, if alkyl (or aryl) potassium or alkyl (or aryl) sodium is used as the organic alkali metal compound, the target potassium or sodium compound of may be obtained by mixing a lithium compound having an alkyl group or an aryl group and a potassium or sodium compound having an alkoxy group. Examples of the potassium or sodium compound having an alkoxy group used here include t-butoxy potassium or t-butoxy sodium. The amount of the potassium or sodium compound having an alkoxy group to be used is not particularly limited, and is usually 0.1 to 5.0 moles, preferably 0.2 to 3.0 moles, and more preferably 0.3 to 2.0 moles with respect to the lithium compound having an alkyl group or an aryl group.

The inert solvent is not particularly limited as long as it is a solvent capable of dissolving a compound to be reacted, and a hydrocarbon-based solvent is preferably used. Specific examples include aliphatic hydrocarbons such as n-hexane, n-heptane and n-octane; and alicyclic hydrocarbons such as cyclohexane, cyclopentane and methylcyclohexane. Note that, one of these solvents may be singly used, or a mixture of two or more of these may be used.

The reaction time and the reaction temperature in the first step of the present invention are not particularly limited, and the reaction time is usually 1 minute to 10 days, and preferably 1 minute to 5 days, and the reaction temperature is usually −50° C. to 100° C.

Besides, when causing the aromatic compound having three or more carbon atoms directly bonded to an aromatic ring in one molecule to react with the organic alkali metal compound, a compound having a coordinating ability for an alkali metal atom may be allowed to coexist for purpose of promoting the reaction. As the compound having a coordinating ability for an alkali metal atom, Lewis base compounds having a hetero atom are suitably used, and among these compounds, Lewis base compounds having a nitrogen atom or an oxygen atom are particularly suitably used. Specific examples of the Lewis base compounds having a nitrogen atom or an oxygen atom include chain ether compounds such as diethyl ether, anisole, diphenyl ether, dimethoxybenzene, dimethoxyethane, diglyme, and ethylene glycol dibutyl ether; tertiary amine compounds having one nitrogen atom in a molecule such as trimethylamine and triethylamine; cyclic ether compounds having one oxygen atom in a molecule such as tetrahydrofuran and tetrahydropyran; nitrogen-containing heterocyclic compounds such as pyridine, lutidine and 1-methylimidazole; cyclic ether compounds having two or more oxygen atoms in a molecule such as bistetrahydrofuryl propane; tertiary amine compounds having two or more nitrogen atoms in a molecule such as N,N,N',N'-tetramethylethylenediamine, dipiperidinoethane, 1,4-diazabicyclo[2.2.2]octane, (−)-sparteine, and N,N,N',N'',N''-pentamethyldiethylenetriamine; and tertiary amide compounds having a nitrogen-hetero atom bond in a molecule such as hexamethylphosphoamide.

The amount of the compound having a coordinating ability for an alkali metal atom to be used is not particularly limited, and may be determined in accordance with the strength of the coordinating ability. For example, if a chain ether compound or a tertiary amine compound having one nitrogen atom in a molecule, that is, a compound having a comparatively weak coordinating ability, is used as the compound having a coordinating ability for an alkali metal atom, the amount to be used is usually 1 to 100 moles, preferably 5 to 50 moles, and more preferably 10 to 25 moles with respect to 1 mole of an alkali metal atom present in the organic alkali metal compound to be reacted with the aromatic compound. Alternatively, if a cyclic ether compound having one oxygen atom in a molecule or a nitrogen-containing heterocyclic compound, that is, a compound having a medium coordinating ability, is used as the compound having a coordinating ability for an alkali metal atom, the amount to be used is usually 1 to 100 moles, preferably 1 to 20 moles, and more preferably 2 to 10 moles with respect to 1 mole of the alkali metal atom present in the organic alkali metal compound to be reacted with the aromatic compound. Alternatively, if a cyclic ether compound having two or more oxygen atoms in a molecule, a tertiary amine compound having two or more nitrogen atoms in a molecule, or a tertiary amide compound having a nitrogen-hetero atom bond in a molecule, that is, a compound having a comparatively strong coordinate ability, is used as the compound having a coordinating ability for an alkali metal atom, the amount to be used is usually 0.01 to 5 moles, preferably 0.01 to 2 moles, and more preferably 0.01 to 1.5 moles with respect to 1 mole of the alkali metal atom present in the organic alkali metal compound to be reacted with the aromatic compound. If the amount of the compound having a coordinating ability for an alkali metal atom to be used is too great, the reaction is liable to no longer proceed. Incidentally, one of these compounds having a coordinating ability for an alkali metal atom may be singly used, or two or more of these may be used in combination.

From the viewpoint that the reaction efficiency in causing the aromatic compound having three or more carbon atoms directly bonded to an aromatic ring in one molecule to react with the organic alkali metal compound can be improved and that the productivity of the alkali metal-reacted aromatic compound resulting from the reaction can be further improved, at least one compound selected from the group consisting of a cyclic ether compound having two or more oxygen atoms in a molecule, a tertiary amine compound having two or more nitrogen atoms in a molecule, and a tertiary amide compound having a nitrogen-hetero atom bond in a molecule is particularly preferably used as the compound having a coordinating ability for an alkali metal atom, and the amount to be used is particularly preferably 0.02 to 0.4 moles with respect to 1 mole of the alkali metal atom present in the organic alkali metal compound to be reacted with the aromatic compound.

In causing the aromatic compound having three or more carbon atoms directly bonded to an aromatic ring in one molecule to react with the organic alkali metal compound, if the compound having a coordinating ability for an alkali metal atom is allowed to coexist, the order of adding these compounds is not particularly limited. From the viewpoint of attaining particularly high production efficiency of the alkali metal-reacted aromatic compound, however, an order in which the aromatic compound and the organic alkali metal compound are caused to coexist, then the compound having a coordinating ability for an alkali metal compound is added to the resultant system, or an order in which the aromatic compound and the compound having a coordinating ability for an alkali metal atom are caused to coexist, then the organic alkali metal compound is added to the resultant system is suitably employed. When the addition is performed in such an order, insolubilization caused by complex formation between the organic alkali metal compound and the compound having a coordinating ability for an alkali metal atom is prevented, and hence, the production efficiency of the alkali metal-reacted aromatic compound can be particularly high.

According to the first step of the present invention, the alkali metal-reacted aromatic compound can be obtained by causing the aromatic compound having three or more carbon atoms directly bonded to an aromatic ring in one molecule to react with the alkali metal atom by the above-described method. Incidentally, the alkali metal-reacted aromatic compound is not particularly limited as long as it is a compound where an alkali metal atom is bonded to an aromatic compound, and according to the first step of the present invention, an alkali metal-reacted aromatic compound having three or more carbon atoms directly bonded to an alkali metal atom and an aromatic ring in one molecule can be usually obtained. Incidentally, in the alkali metal-reacted aromatic compound in this case, the alkali metal atom is usually present in the form of a cation in the alkali metal-reacted aromatic compound, and the carbon atoms directly bonded to the alkali metal atom and the aromatic ring are bonded to such a cation state alkali metal atom, and hence are present in the form of an anion in general. In such an alkali metal-reacted aromatic compound, the alkali metal atom thus present in a cation state and the carbon atom thus present in an anion state forms an ionic bond, and thus are directly bonded to each other.

Besides, in the present invention, the alkali metal-reacted aromatic compound having three or more carbon atoms directly bonded to an alkali metal atom and an aromatic ring in one molecule is obtained in the first step, and this compound is used as a polymerization initiator in the second step described later, and therefore, the three or more carbon atoms respectively bonded to the alkali metal atom contained in the alkali metal-reacted aromatic compound respectively work as polymerization starting points to grow conjugated diene polymer chains with living polymerization ability, and thus, the resultant conjugated diene rubber can be provided with a radial structure.

Furthermore, examples of the alkali metal-reacted aromatic compound having three or more carbon atoms directly bonded to an alkali metal atom and an aromatic ring in one molecule include an alkali metal-reacted aromatic compound represented by the following general formula (6), that is, an alkali metal-reacted aromatic compound obtained by using the aromatic compound represented by the general formula (1), and an alkali metal-reacted aromatic compound represented by the following general formula (7), that is, an alkali metal-reacted aromatic compound obtained by using the aromatic compound represented by the general formula (5).

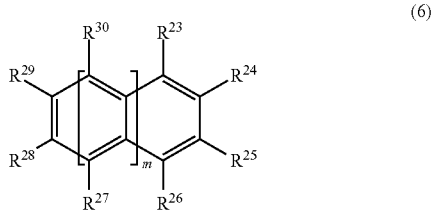

(6)

In the general formula (6), each of $R^{23}$ to $R^{30}$ independently represents an atom or a group selected from the group consisting of a hydrogen atom, a $C_1$ to $C_{10}$ alkyl group and a $C_1$ to $C_{10}$ alkali metal-reacted alkyl group in which an alkali metal atom is bonded to the α-position, and three or more of $R^{23}$ to $R^{30}$ are a $C_1$ to $C_{10}$ alkali metal-reacted alkyl group in which an alkali metal atom is bonded to the α-position. Besides, "m" is an integer of 0 to 5, and when "m" is 2 or more, three or more benzene rings present therein may be condensed with one another in arbitrary position regardless of the structure represented by the general formula (6). Note that, the team "independently" means that when "m" is, for example, 2 or more, each of $R^{27}$ and $R^{30}$ is present in plural number, and these plural $R^{27}$ or $R^{30}$ may be the same as or different from each other.

Preferably, in the general formula (6), "m" represents 0, three of $R^{23}$, $R^{24}$, $R^{25}$, $R^{26}$, $R^{28}$ and $R^{29}$ are a $C_1$ to $C_{10}$ alkyl metal-reacted alkyl group in which an alkali metal atom is bonded to the α-position, and the reminder of $R^{23}$, $R^{24}$, $R^{25}$, $R^{26}$, $R^{28}$ and $R^{29}$ are a hydrogen atom.

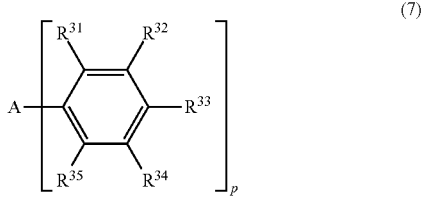

(7)

In the general formula (7), each of $R^{31}$ to $R^{35}$ independently represents an atom or a group selected from the group consisting of a hydrogen atom, a $C_1$ to $C_{10}$ alkyl group and a $C_1$ to $C_{10}$ alkali metal-reacted alkyl group in which an alkali metal atom is bonded to the α-position, and one or more of $R^{31}$ to $R^{35}$ are a $C_1$ to $C_{10}$ alkali metal-reacted alkyl group in which an alkali metal atom is bonded to the α-position. Besides, "A" represents an arbitrary linking group, and "p" is an integer of 3 to 100. Note that, the term "independently" means that if "p" is, for example, 2 or more, each of $R^{31}$ to $R^{35}$ is present in plural number, and these plural $R^{31}$, $R^{32}$, $R^{33}$, $R^{34}$ or $R^{35}$ may be the same as or different from each other.

<Second Step>

Subsequently, the second step of the method of production of the present invention will be described. The second step performed in the method of production of the present invention is a step of polymerizing a monomer containing at least a conjugated diene compound by using the alkali metal-reacted aromatic compound obtained in the first step so as to obtain a conjugated diene rubber having an active end. Note that, the alkali metal-reacted aromatic compound obtained in the first step usually works as a polymerization initiator.

The conjugated diene compound is not particularly limited, and examples include 1,3-butadiene, isoprene, 2,3-dimethyl-1,3-butadiene, 1,3-pentadiene, 2-methyl-3-ethyl-1,3-butadiene, 2-methyl-1,3-pentadiene, 1,3-hexadiene and 1,3-cyclohexadiene. Among these compounds, 1,3-butadiene, isoprene or 1,3-pentadiene is preferred, and 1,3-butadiene or isoprene is particularly preferred. Note that, one of these conjugated diene compounds may be singly used, or two or more of these may be used in combination.

Furthermore, in the method of production of the present invention, the conjugated diene rubber having an active end is preferably a rubber which is obtained through copolymerization of a monomer containing an aromatic vinyl compound in addition to the conjugated diene compound. The aromatic vinyl compound is not particularly limited, and examples include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinyl naphthalene, dimethylaminomethyl styrene and dimethylaminoethyl styrene. Among these compounds, styrene, α-methylstyrene or 4-methylstyrene is preferred, and styrene is particularly preferred. Note that, one of these aromatic vinyl compounds may be singly used, or two or more of these may be used in combination. The conjugated diene rubber having an active end used in the present invention contains a conjugated diene monomer unit in a ratio of, preferably 50 to 100 wt % and particularly preferably 55 to 95 wt %, and contains an aromatic vinyl monomer unit in a ratio of preferably 50 to 0 wt %, and particularly preferably 45 to 5 wt %.

Furthermore, in the method of production of the present invention, the conjugated diene rubber having an active end may be a rubber which is obtained, if desired, through copolymerization of monomers including an additional monomer in addition to the conjugated diene compound and the aromatic vinyl compound as long as the objects of the present invention are not impaired. Examples of the additional monomer include α,β-unsaturated nitriles such as acrylonitrile and methacrylonitrile; unsaturated carboxylic acids or acid anhydrides such as acrylic acid, methacrylic acid and maleic anhydride; unsaturated carboxylic acid esters such as methyl methacrylate, ethyl acrylate and butyl acrylate; and non-conjugated dienes such as 1,5-hexadiene, 1,6-heptadiene, 1,7-octadiene, dicyclopentadiene and 5-ethylidene-2-norbornene. Such a monomer is contained in the conjugated diene rubber having an active end in a ratio of preferably 10 wt % or less, and more preferably 5 wt % or less in tams of a monomer unit.

In the method of production of the present invention, the system of copolymerization employed for obtaining a copolymer using two or more monomers is not particularly limited, and random, block and taper, and any other type may be employed, and random bonding type is preferred. When the random type copolymerization is employed, the resultant cross-linked rubber can be excellent in the low heat buildup property.

Since the polymerization reaction proceeds usually with a living property in the method of production of the present invention, a use ratio between the alkali metal-reacted aromatic compound used as a polymerization initiator and the monomer may be determined in accordance with the target molecular weight of the polymer, and the amount of an alkali metal in the alkali metal-reacted aromatic compound with respect to 1 mole of the monomer is selected to be usually 0.000001 to 0.1 mole, preferably 0.00001 to 0.05 mole, and particularly preferably 0.0001 to 0.01 mole. If the amount of the alkali metal-reacted aromatic compound to be used is too small, it is apprehended that the molecular weight of the resultant conjugated diene rubber becomes so large that it is difficult to handle, or that the polymerization reaction does not sufficiently proceed. On the other hand, if the amount of the alkali metal-reacted aromatic compound to be used is too large, it is apprehended that the molecular weight of the resultant conjugated diene rubber becomes so small that its characteristics as a rubber material are degraded.

Besides, in performing the polymerization reaction, the compound having a coordinating ability for an alkali metal atom described above may be added to the polymerization reaction system for purposes of controlling the polymerization speed and the microstructure of the resultant conjugated diene rubber. The amount of the compound having a coordinating ability for an alkali metal atom to be used is usually 20 moles or less, preferably 15 moles or less, and particularly preferably 5 moles or less with respect to 1 mole of the alkali metal atom present in the alkali metal-reacted aromatic compound used as the polymerization initiator. If the amount of the compound having a coordinating ability for an alkali metal atom to be used is too large, it is apprehended that the polymerization reaction is inhibited. Incidentally, if the compound having a coordinating ability for an alkali metal atom is used in preparing the alkali metal-reacted aromatic compound in the above-described first step, a solution containing the compound may be used as it is.

In particular, from the viewpoint that the resultant cross-linked rubber can be more excellent in the low heat buildup property, at least one compound selected from the group consisting of a cyclic ether compound having two or more oxygen atoms in a molecule, a tertiary amine compound having two or more nitrogen atoms in a molecule, and a tertiary amide compound having a nitrogen-hetero atom bond in a molecule is preferably caused to present in a ratio of 0.02 to 3.0 moles with respect to 1 mole of an alkali metal atom present in an alkali metal compound used as the polymerization initiator (which alkali metal compound herein is not limited to the alkali metal-reacted aromatic compound but embraces all alkali metal compounds present in the reaction system and working as the polymerization initiator). In this manner, a conjugated diene rubber having an appropriate vinyl bond content can be obtained, and as a result, a cross-linked rubber obtained by using the same can be more excellent in the low heat buildup property.

As the polymerization type for the monomer containing the conjugated diene compound employed in the method of production of the present invention, a solution polymerization method is preferably employed.

A solvent used in the solution polymerization method is not particularly limited as long as it is inert in the polymerization reaction and is capable of dissolving a monomer and a polymerization catalyst, and a hydrocarbon-based solvent is preferably used. Specific examples include aromatic hydrocarbons such as benzene, toluene, xylene and ethylbenzene; aliphatic hydrocarbons such as n-hexane, n-heptane and n-octane; alicyclic hydrocarbons such as cyclohexane, cyclopentane and methylcyclohexane; and ethers such as tetrahydrofuran, diethyl ether and cyclopentyl methyl ether. Among these, the aliphatic hydrocarbons and the alicyclic hydrocarbons are preferred because polymerization activity is increased when any of these is used as the solvent. Note that, one of these solvents may be singly used, or a mixture of two or more of these may be used.

The concentration of the monomer in a polymerization solution used in the solution polymerization method is not particularly limited, and is selected in a range of usually 1 to 50 wt %, preferably 2 to 45 wt %, and more preferably 5 to 40 wt %. If the concentration of the monomer in the solution is too low, it is apprehended that the productivity of the conjugated diene rubber may be lowered, and if the concentration is too high, the viscosity of the resultant solution is so high that the solution becomes difficult to handle. Besides, also the polymerization temperature is not particularly limited, and is usually −30° C. to +200° C., and preferably 0° C. to +180° C. Also the polymerization time is not particularly limited, and is usually 1 minute to 100 hours. As the polymerization system, any of the batch system, continuous system and the other systems may be employed, and in copolymerization of a conjugated diene compound and an aromatic vinyl compound, the batch system is preferred from the viewpoint that the randomness of bonds between a conjugated diene monomer unit and an aromatic vinyl monomer unit can be easily controlled.

By thus polymerizing the monomer containing the conjugated diene compound, the conjugated diene rubber can be obtained. Incidentally, in the method of production of the present invention, since the polymerization reaction usually proceeds with a living property, a polymer having an active end is present in the polymerization reaction system. Therefore, the conjugated diene rubber obtained by the polymerization reaction in the second step has an active end. To this, in the method of production of the present invention, the active end of the conjugated diene rubber obtained by the polymerization reaction is caused to react with an activity control agent and then with a specific modifier in the third step and the fourth step described later, so as to obtain modified conjugated diene rubber. In particular, in the present invention, the conjugated diene rubber having an active end obtained in the second step usually has a radial structure because it is obtained by using the alkali metal-reacted aromatic compound obtained in the first step described above. Owing to the radial structure, the number of active ends present in one molecule is larger than in linear conjugated diene rubber having an active end on one side of a polymer chain, and hence, the conjugated diene rubber can be efficiently modified, resulting in further improving the affinity with silica. Besides, owing to the radial structure, a multi-branched structure can be obtained without using a coupling agent.

<Third Step>

Subsequently, the third step of the method of production of the present invention will be described. The third step performed in the method of production of the present invention is a step of causing the active end of the conjugated diene rubber having an active end obtained in the second step to react with an activity control agent so as to obtain a conjugated diene rubber reacted with an activity control agent.

The activity control agent is not particularly limited, and any compound capable of reacting with the active end of the conjugated diene rubber having an active end obtained in the second step and capable of lowering the activity of the active end after the reaction may be used. For lowering the activity of the active end, the activity of the active end itself may be lowered directly, and alternatively, a structure in which a modifier is difficult to react with the active end (for example, a structure in which the modifier is difficult to approach the active end) may be provided. Examples of the activity control agent include a compound represented by the following general formula (3) and a compound represented by the following general formula (4). Among these compounds, a compound represented by the general formula (4) is preferred from the viewpoint of the reactivity with the active end of the conjugated diene rubber having an active end and the degree of lowering the activity of the active end of the resultant conjugated diene rubber reacted with an activity control agent.

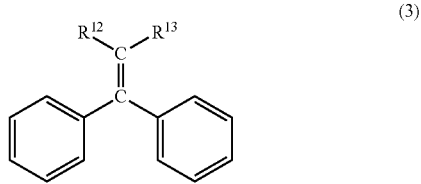

(3)

In the general formula (3), each of $R^{12}$ and $R^{13}$ independently represents a hydrogen atom or a $C_1$ to $C_{10}$ alkyl group, and is preferably a hydrogen atom.

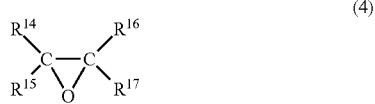

(4)

In the general formula (4), each of $R^{14}$ to $R^{17}$ independently represents a hydrogen atom or a $C_1$ to $C_{12}$ alkyl group, and it is preferable that each of $R^{14}$, $R^{15}$ and $R^{16}$ represents a hydrogen atom and that $R^{17}$ represents a hydrogen atom or a $C_1$ to $C_{12}$ alkyl group. Besides, the compound represented by the general formula (4) is preferably ethylene oxide or propylene oxide, and more preferably propylene oxide.

If the compound represented by the general formula (3) is used as the activity control agent, the reaction performed in the third step proceeds in accordance with the following reaction formula, so that a conjugated diene rubber reacted with an activity control agent which is represented by the following general formula (9) can be obtained. Note that, in the following reaction formula, the conjugated diene rubber having an active end obtained in the second step is represented by the general formula (8). In the general formula (8), "Polymer" represents a base polymer constituting the conjugated diene rubber having an active end, and $M^1$ represents an alkali metal atom.

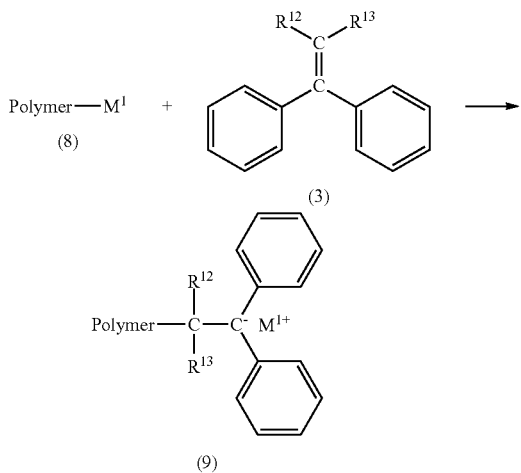

Alternatively, if the compound represented by the general formula (4) is used as the activity control agent, the reaction performed in the third step proceeds in accordance with the following reaction formula, so that a conjugated diene rubber reacted with an activity control agent which is represented by the following general formula (10) and/or the following general formula (11) can be obtained. Note that, the conjugated diene rubber having an active end obtained in the second step is represented by the general formula (8) also in the following reaction formula.

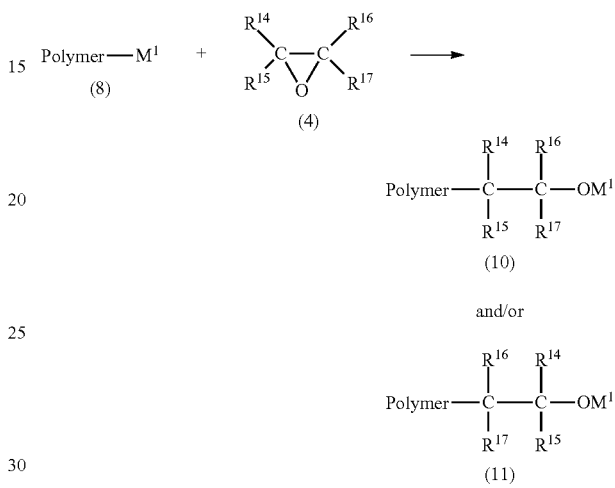

The amount of the activity control agent to be used in the third step of the method of production of the present invention is not particularly limited, and is preferably 0.05 to 5 moles, more preferably 0.1 to 3 moles, and particularly preferably 0.5 to 1.5 moles with respect to 1 mole of the alkali metal atom present in the alkali metal-reacted aromatic compound used as the polymerization initiator. If the amount of the activity control agent to be used falls in the above-described range, the effects attained by the addition can be made more conspicuous. Note that, one of these activity control agents may be singly used, or two or more of these may be used in combination.

A method for causing the active end of the conjugated diene rubber having an active end obtained in the second step to react with the activity control agent is not particularly limited, and a method in which the conjugated diene rubber having an active end obtained in the second step and the activity control agent are mixed in a solvent capable of dissolving these may be employed. As the solvent used here, any of the solvents mentioned above as the examples of the solvent to be used in the polymerization of the conjugated diene rubber can be used. Besides, as a simple and preferable method employed on this occasion, the conjugated diene rubber having an active end obtained in the second step is allowed to remain as the polymerization solution having been used for the polymerization, and the activity control agent is added thereto. The reaction temperature in the third step is not particularly limited, and is usually 0 to 120° C., and the reaction time is not particularly limited, and is usually 1 minute to 1 hour.

<Fourth Step>

Next, the fourth step of the method of production of the present invention will be described. The fourth step performed in the method of production of the present invention is a step of causing the active end of the conjugated diene rubber reacted with an activity control agent obtained in the third step to react with a modifier having an alkoxy group and a halogen atom-containing group so as to obtain a modified conjugated diene rubber.

In the method of production of the present invention, when the active end of the conjugated diene rubber reacted with an activity control agent is caused to react with the modifier having an alkoxy group and a halogen atom-containing group, the conjugated diene rubber can be modified so as to improve the affinity with a filler such as silica, and thus, the resultant modified conjugated diene rubber can be made one which is excellent in the processability, and can give a cross-linked rubber excellent in the tensile strength, the elongation at break, the low heat buildup property and the wet grip property.

In particular, when the active end of the conjugated diene rubber reacted with an activity control agent is caused to react with the modifier, in one embodiment, a halogen atom contained in the modifier reacts with the active end so that an alkoxy group can be introduced into the end of the conjugated diene rubber, and the alkoxy group, which is hydrolyzed if necessary, exhibits high affinity with the filler such as silica. Owing to such an action of the alkoxy group, the resultant cross-linked rubber can be made one which is particularly excellent in the tensile strength, the elongation at break, the low heat buildup property and the wet grip property.

On the other hand, the alkoxy group has high reactivity, and therefore, if the modifier containing the alkoxy group is directly reacted with the active end of the conjugated diene rubber having the radial structure, there arises a problem that gelation (three-dimensional cross-linking) is caused due to the high reactivity of the alkoxy group. On the contrary, in the present invention, the step of causing the active end of the conjugated diene rubber to react with the activity control agent to lower the activity of the active end of the conjugated diene rubber is employed as the third step. In the present invention, the conjugated diene rubber thus having been reacted with the activity control agent to lower the activity of the active end is caused to react with the modifier having an alkoxy group and a halogen atom-containing group, and therefore, the alkoxy group can be introduced to the end of the conjugated diene rubber having the radial structure while suppressing the problem of gelation due to the high reactivity of the alkoxy group. As a result, while realizing excellent processability by suppressing lowering of the processability otherwise caused by the gelation, the resultant cross-linked rubber can be made one which is particularly excellent in the tensile strength, the elongation at break, the low heat buildup property and the wet grip property.

The modifier having an alkoxy group and a halogen atom-containing group is not particularly limited, any compound having an alkoxy group and a halogen atom-containing group and capable of reacting with the active end of the conjugated diene rubber reacted with an activity control agent obtained in the third step may be used, and a compound represented by the following general formula (2) can be suitably used.

(2)

In the general formula (2), $X^1$ represents a group represented by $X^2$ or $R^{11}X^2$ (wherein $X^2$ represents a halogen atom, preferably a chlorine atom, and $R^{11}$ represents a $C_1$ to $C_4$ alkylene group), and is preferably a group represented by $R^{11}X^2$. Each of $R^9$ and $R^{10}$ independently represents a $C_1$ to $C_{10}$ alkyl group. Besides, "n" is an integer of 1 to 3.

The amount of the modifier having an alkoxy group and a halogen atom-containing group to be used in the fourth step of the method of production of the present invention is not particularly limited, and is such an amount that the amount of a halogen atom contained in the halogen atom-containing group with respect to 1 mole of the alkali metal atom present in the alkali metal-reacted aromatic compound used as the polymerization initiator can be, preferably 0.05 to 5 moles, more preferably 0.1 to 3 moles, and particularly preferably 0.5 to 1.5 moles. If the amount of the modifier having an alkoxy group and a halogen atom-containing group to be used falls in the above-described range, the effects attained by the addition can be made more conspicuous. Note that, one modifier having an alkoxy group and a halogen atom-containing group may be singly used or two or more of such modifiers may be used in combination.

A method for causing the active end of the conjugated diene rubber reacted with an activity control agent obtained in the third step to react with the modifier having an alkoxy group and a halogen atom-containing group in the fourth step of the method of production of the present invention is not particularly limited, and a method in which the conjugated diene rubber reacted with an activity control agent obtained in the above third step and the modifier having an alkoxy group and a halogen atom-containing group are mixed in a solvent capable of dissolving these, or the like may be employed. As the solvent used here, any of the solvents mentioned above as the examples of the solvent to be used in the polymerization of the conjugated diene rubber can be used. Besides, as a simple and preferable method employed on this occasion, the conjugated diene rubber having an active end obtained in the second step is allowed to remain as the polymerization solution having been used for the polymerization, the reaction with the activity control agent of the third step is performed in the form of the polymerization solution used in the second step, and the modifier having an alkoxy group and a halogen atom-containing group is added to the resultant polymerization solution. The reaction temperature in the fourth step is not particularly limited, and is usually 0 to 120° C., and the reaction time is not particularly limited, and is usually 1 minute to 1 hour.

If an unreacted active end remains after causing the conjugated diene rubber reacted with an activity control agent to react with the modifier having an alkoxy group and a halogen atom-containing group, the unreacted active end is preferably deactivated by adding, to the polymerization solution, a polymerization terminator of an alcohol, such as methanol, ethanol and isopropanol, water or the like.

To the solution of the modified conjugated diene rubber thus obtained, an antioxidant such as a phenol-based stabilizer, phosphorus-based stabilizer and sulfur-based stabilizer may be added if desired. The amount of the antioxidant to be added may be appropriately determined in accordance with the type thereof. Besides, an extension oil may also be blended therein to obtain oil-extended rubber if desired. Examples of the extension oil include petroleum-based softening agents such as paraffin-based, aromatic-based, and naphthene-based agents, plant-based softening agents, and fatty acids. If a petroleum-based softening agent is used, a content therein of a polycyclic aromatic compound extracted by a method of IP346 (a test method of the Institute Petroleum of the UK) is preferably less than 3%. If the extension oil is used, the amount to be used is usually 5 to 100 parts by weight with respect to 100 parts by weight of the modified conjugated diene rubber. Besides, the modified conjugated diene rubber resulting from the modification reaction can be separated and collected from the reaction mixture by a usual operation employed in isolating rubber from a solution, such as reprecipitation, solvent removal under heating, solvent removal under reduced pressure, and solvent removal using steam (steam stripping).

In the method of production of the present invention, the alkali metal-reacted aromatic compound is obtained in the first step by causing the aromatic compound having three or more carbon atoms directly bonded to an aromatic ring in one molecule to react with the alkali metal atom, and the alkali metal-reacted aromatic compound is used in the second step to perform the polymerization of the conjugated diene compound. Therefore, the three or more carbon atoms respectively directly bonded to the alkali metal atom usually contained in the alkali metal-reacted aromatic compound respectively work as the polymerization starting points to grow conjugated diene polymer chains with living polymerization ability, and thus, the resultant conjugated diene rubber can be provided with a radial structure. Then, in the present invention, the active end of the conjugated diene rubber having such a radial structure is caused to react with the activity control agent in the third step, and to react with the modifier having an alkoxy group and a halogen atom-containing group in the subsequent fourth step, and as a result, the modified conjugated diene rubber having a radial structure and having an alkoxy group at the end is obtained.

The modified conjugated diene rubber of the present invention thus obtained has improved affinity with a filler or the like owing to the radial structure, and in addition, the activity of the active end is lowered by the reaction with the activity control agent before the modification of the active end, and subsequently, the reaction with the modifier having an alkoxy group and a halogen atom-containing group is performed. Therefore, according to the present invention, the occurrence of gelation (three-dimensional cross-linking) of the conjugate diene rubber can be effectively prevented in the modification reaction, as a result, the processability can be improved. In addition, the modified conjugated diene rubber obtained by the method of production of the present invention has an alkoxy group introduced to the end of the polymer chain, and hence, the affinity with a filler or the like can be remarkably improved owing to the effect of the alkoxy group, so that a cross-linked rubber obtained by blending with a filler such as silica can be made one further improved in the tensile strength, the elongation at break, the low heat buildup property and the wet grip property.

Incidentally, a ratio of radial conjugated diene rubber (that is, three or more branched conjugated diene rubber) in the modified conjugated diene rubber obtained by the method of production of the present invention is not particularly limited, and is usually 10 to 100 wt %, and preferably 20 to 100 wt %. If the radial conjugated diene rubber is contained in such a ratio, the processability of the modified conjugated diene rubber can be further improved, and in addition, the affinity with a filler such as silica can be further improved.

The weight average molecular weight of the modified conjugated diene rubber obtained by the method of production of the present invention is not particularly limited, and is usually 1,000 to 3,000,000, preferably 10,000 to 2,000,000, and more preferably 100,000 to 1,500,000 as a value measured by gel permeation chromatography in terms of polystyrene. If the weight average molecular weight of the modified conjugated diene rubber falls in the above-described range, silica can be easily blended in the modified conjugated diene rubber, and hence the resultant rubber composition can be more excellent in the processability.

Besides, a molecular weight distribution expressed as a ratio (Mw/Mn) between a weight average molecular weight (Mw) and number average molecular weight (Mn) of the modified conjugated diene rubber obtained by the method of production of the present invention is also not particularly limited, and is preferably 1.1 to 5.0, and particularly preferably 1.2 to 3.0. If the molecular weight distribution of the modified conjugated diene rubber falls in the above-described range, the resultant cross-linked rubber can be more excellent in the low heat buildup property.

Furthermore, the Moony viscosity ($ML_{1+4}$, 100° C.) of the modified conjugated diene rubber obtained by the method of production of the present invention is not also particularly limited, and is usually 20 to 150, and preferably 30 to 120. If the Mooney viscosity of the modified conjugated diene rubber falls in the above-described range, the resultant rubber composition is excellent in the processability. Incidentally, if the modified conjugated diene rubber is formed into oil-extended rubber, the Mooney viscosity of the oil-extended rubber is preferably set to the above-described range.

Additionally, the vinyl bond content in the conjugated diene unit of the modified conjugated diene rubber obtained by the method of production of the present invention is usually 1 to 80 mol %, and preferably 5 to 75 mol %. If the vinyl bond content falls in the above-described range, the resultant cross-linked rubber can be more excellent in the low heat buildup property.

<Rubber Composition>

The rubber composition of the present invention is a composition containing 100 parts by weight of a rubber ingredient containing the modified conjugated diene rubber obtained by the method of production of the present invention described above and 10 to 200 parts by weight of silica.

Examples of the silica to be used in the present invention include dry-process white carbon, wet-process white carbon, colloidal silica and precipitated silica. Among these, wet-process white carbon containing hydrated silicic acid as a main component is preferred. Alternatively, a carbon-silica dual phase filler containing silica supported on carbon black may be used. One of such silica can be singly used, or two or more of these can be used in combination. The nitrogen adsorption specific surface area of the silica to be used (measured in accordance with ASTM D3037-81 by BET method) is preferably 50 to 300 m$^2$/g, more preferably 80 to 220 m$^2$/g, and particularly preferably 100 to 170 m$^2$/g. Besides, the silica has pH of preferably 5 to 10.

The amount of the silica contained in the rubber composition of the present invention is 10 to 200 parts by weight, preferably 30 to 150 parts by weight, and more preferably 50 to 100 parts by weight with respect to 100 parts by weight of the rubber ingredient of the rubber composition. If the amount of the silica falls in the above-described range, the processability of the rubber composition becomes excellent, and the resultant cross-linked rubber becomes excellent in the low heat buildup property.

From the viewpoint of further improving the low heat buildup property, the rubber composition of the present invention may further contain a silane coupling agent. Examples of the silane coupling agent include vinyl triethoxysilane, β-(3,4-epoxycyclohexyl)ethyl trimethoxysilane, N-(β-aminoethyl)-γ-aminopropyl trimethoxysilane, 3-octathio-1-propyl-triethoxysilane, bis(3-(triethoxysilyl) propyl)disulfide, bis(3-(triethoxysilyl)propyl)tetrasulfide, γ-trimethoxysilylpropyldimethylthiocarbamyl tetrasulfide and γ-trimethoxysilylpropylbenzothiazyl tetrasulfide. One of these silane coupling agents can be singly used, or two or more of these can be used in combination. The amount of the silane coupling agent to be contained is preferably 0.1 to 30 parts by weight, and more preferably 1 to 15 parts by weight with respect to 100 parts by weight of the silica.

Furthermore, the rubber composition of the present invention may further contain carbon black such as furnace black, acetylene black, thermal black, channel black and graphite. Among these, furnace black is preferred. One of these carbon blacks can be singly used, or two or more of these can be used in combination. The amount of the carbon black to be contained is usually 120 parts by weight or less with respect to 100 parts by weight of the rubber ingredient in the rubber composition.

Incidentally, a method for adding the silica to the rubber ingredient containing the modified conjugated diene rubber of the present invention is not particularly limited, and a method in which the silica is added to the rubber ingredient in a solid form and the resultant is kneaded (a dry kneading method), a method in which the silica is added to a solution containing the modified conjugated diene rubber and the resultant is solidified/dried (a wet kneading method) or the like can be applied.

Furthermore, the rubber composition of the present invention preferably further contains a cross-linking agent. Examples of the cross-linking agent include sulfur-containing compounds such as sulfur and halogenated sulfur, organic peroxides, quinone dioximes, organic polyvalent amine compounds and alkylphenol resins having a methylol group. Among these, sulfur is preferably used. The amount of the cross-linking agent to be contained is preferably 0.1 to 15 parts by weight, more preferably 0.5 to 5 parts by weight, and particularly preferably 1 to 4 parts by weight with respect to 100 parts by weight of the rubber ingredient of the rubber composition.

Furthermore, the rubber composition of the present invention may contain, in addition to the above ingredients, a compounding agent such as a cross-linking accelerator, cross-linking activator, antioxidant, filler (excluding the silica and the carbon black described above), activator, process oil, plasticizer, lubricant and tackifier in a necessary amount by an ordinary method.

If sulfur or a sulfur-containing compound is used as the cross-linking agent, a cross-linking accelerator and cross-linking activator are preferably used together. Examples of the cross-linking accelerator include a sulfenamide-based cross-linking accelerator; guanidine-based cross-linking accelerator; thiourea-based cross-linking accelerator; thiazole-based cross-linking accelerator; thiuram-based cross-linking accelerator; dithiocarbamic acid-based cross-linking accelerator; and xanthic acid-based cross-linking accelerator. Among these, one containing a sulfenamide-based cross-linking accelerator is preferred. One of these cross-linking accelerators is singly used, or two or more of these are used in combination. The amount of the cross-linking accelerator to be contained is preferably 0.1 to 15 parts by weight, more preferably 0.5 to 5 parts by weight, and particularly preferably 1 to 4 parts by weight with respect to 100 parts by weight of the rubber ingredient of the rubber composition.

Examples of the cross-linking activator include higher fatty acids such as stearic acid; and zinc oxide. One of these cross-linking activators is singly used, or two or more of these are used in combination. The amount of the cross-linking activator to be contained is preferably 0.05 to 20 parts by weight, and particularly preferably 0.5 to 15 parts by weight with respect to 100 parts by weight of the rubber ingredient of the rubber composition.

Furthermore, the rubber composition of the present invention may contain additional rubber different from the modified conjugated diene rubber obtained by the method of production of the present invention described above. Examples of the additional rubber include natural rubber, polyisoprene rubber, emulsion polymerization styrene-butadiene copolymer rubber, solution polymerization styrene-butadiene copolymer rubber, polybutadiene rubber (which may be polybutadiene rubber containing crystal fiber consisting of a 1,2-polybutadiene polymer), styrene-isoprene copolymer rubber, butadiene-isoprene copolymer rubber, styrene-isoprene-butadiene copolymer rubber, acrylonitrile-butadiene copolymer rubber, and acrylonitrile-styrene-butadiene copolymer rubber. Among these, natural rubber, polyisoprene rubber, polybutadiene rubber, and solution polymerization styrene-butadiene copolymer rubber are preferred. One of these rubbers can be singly used, or two or more of these can be used in combination.

In the rubber composition of the present invention, the modified conjugated diene rubber obtained by the method of production of the present invention accounts for preferably 10 to 100 wt %, and particularly preferably 40 to 100 wt % of the rubber ingredient of the rubber composition. If the modified conjugated diene rubber of the present invention is contained in the rubber ingredient in such a ratio, a cross-linked rubber excellent in the tensile strength, the elongation at break, the low heat buildup property and the wet grip property can be obtained.

To obtain the rubber composition of the present invention, the ingredients may be kneaded in accordance with an ordinary method, and for example, ingredients excluding thermally unstable ingredients such as the cross-linking agent and cross-linking accelerator are kneaded with the modified conjugated diene rubber, and then the resultant kneaded product is mixed with the thermally unstable ingredients such as the cross-linking agent and cross-linking accelerator, and thus, the target composition can be obtained. The temperature for kneading the ingredients excluding the thermally unstable ingredients with the modified conjugated diene rubber is preferably 80 to 200° C., more preferably 100 to 180° C., and the time for kneading them is preferably 30 seconds to 30 minutes. Besides, the kneaded product is mixed with the thermally unstable ingredients after cooling the kneaded product usually to 100° C. or less, and preferably 80° C. or less.

<Cross-linked Rubber>

The cross-linked rubber of the present invention is obtained by cross-linking the rubber composition of the present invention described above.

The cross-linked rubber of the present invention can be produced by using the rubber composition of the present invention, for example, to perform forming by using a forming machine designed for a desired shape, such as an extruder, injection molding machine, press and roll, and performing a cross-linking reaction by heating, and fixing the shape as the cross-linked product. In this case, the cross-linking may be performed after precedently performing the forming or at the same time as the forming. The forming temperature is usually 10 to 200° C., and preferably 25 to 120° C. The cross-linking temperature is usually 100 to 200° C., and preferably 130 to 190° C., and the cross-linking time is usually 1 minute to 24 hours, preferably 2 minutes to 12 hours, and particularly preferably 3 minutes to 6 hours.

Besides, in some cases depending on the shape, the size and the like of the cross-linked rubber, the inside of the rubber may not be sufficiently cross-linked even if the surface thereof has been cross-linked, and therefore, secondary cross-linking may be further performed by heating.

As the heating method, any of general methods used for cross-linking rubber, such as press heating, steam heating, oven heating and hot air heating may be suitable selected.

The cross-linked rubber of the present invention thus obtained is obtained by using the modified conjugated diene rubber obtained by the method of production of the present invention described above, and therefore, it is excellent in the tensile strength, the elongation at break, the low heat buildup property and the wet grip property. In particular, in obtaining the modified conjugated diene rubber by the method of production of the present invention, the activity of the active end is lowered by the reaction with the activity control agent before modifying the active end, and subsequently, the reaction is caused with the modifier having an alkoxy group and a halogen atom-containing group. Therefore, the occurrence of gelation otherwise caused by the addition of the modifier is effectively suppressed, and hence, when blending silica as a filler with the modified conjugated diene rubber, the lowering of dispersibility of the silica due to the influence of a gelled portion is avoided. Accordingly, in the cross-liked rubber of the present invention obtained by using the modified conjugated diene rubber thus obtained by the method of production of the present invention, the silica used as the filler is satisfactorily dispersed, and as a result, the tensile strength, the elongation at break, the low heat buildup property and the wet grip property are particularly excellent.

Owing to these characteristics, the cross-linked rubber of the present invention can be used in a variety of applications including, for example, for a tire, materials for various tire parts such as a cap tread, base tread, carcass, sidewall and bead part; materials for a hose, belt, mat, vibration insulator rubber, and other various industrial products; an agent for improving the shock resistance of a resin; a resin film buffer agent; a shoe sole; rubber shoes; golf balls; toys; and the like. In particular, since the cross-linked rubber of the present invention is excellent in the tensile strength, the elongation at break, the low heat buildup property and the wet grip property, it can be suitably used as a material of a tire, particularly a fuel efficient tire.

EXAMPLES

Now, the present invention will be described based on more detailed examples, but the present invention is not limited to these examples. It is noted that "parts" and "%" used below are based on weight unless otherwise indicated. Furthermore, tests and evaluations were performed as follows.

[Molecular Weight of Rubber]

The molecular weight of rubber was obtained by the gel permeation chromatography as a molecular weight in terms of polystyrene. Specific measurement conditions were set as follows:

Measuring device: high performance liquid chromatograph (product name "HLC-8220" manufactured by Tosoh Corporation)

Columns: two columns, connected in series, available under product name "GMH-HR-H" manufactured by Tosoh Corporation Detector: differential refractometer (product name "RI-8220" manufactured by Tosoh Corporation)

Eluent: tetrahydrofuran

Column temperature: 40° C.

[Branching Degree of Rubber]

The branching degree of rubber was measured using a multiangle light scattering photometer. Specific measurement conditions were set as follows:

Pump: product name "MODEL 515" manufactured by Waters Corporation

Columns: three columns, connected in series, available under product name "GMH-HR-M" manufactured by Tosoh Corporation Detector: differential refractometer (Product name "RI-2414" manufactured by Waters Corporation)

Detector: multiangle light scattering photometer (product name "DAWN EOS" manufactured by Wyatt Technology Corporation)

Eluent: tetrahydrofuran

Column temperature: 23° C.

[Microstructure of Rubber and Modification of Rubber]

Measurement was performed by $^1$H-NMR.

Measuring device: product name "JNM-ECA-400WB" manufactured by JEOL Ltd.

Measurement solvent: deuterochloroform

[Lithiation of Initiator]

Measurement was performed by GC-MS.

GC: product name "Agilent GC 6890NGC" manufactured by Agilent Technologies, Inc.

MS: product name "Agilent MS 5973MSD" manufactured by Agilent Technologies, Inc.

Column: product name "DB1701" manufactured by Agilent Technologies, Inc.

[Gel Weight Ratio]

A rubber (weight: Wa [g]) cut into pieces of about 1 square millimeter was put in a #100 mesh cage to be held in toluene at room temperature (25° C.) for 24 hours, and then pulled up. Subsequently, the resultant rubber left in the #100 mesh cage was dried under vacuum, and the weight after drying (Wb [g]) was weighed. On the basis of these weighed values, a gel weight ratio was obtained as a toluene insoluble=(Wb/Wa)×100(%). Incidentally, as the gel weight ratio is lower, it can be determined that the processability is better.

[Wet Grip Property]

The wet grip property was evaluated by measuring, using a viscoelasticity measuring device (product name "ARES" manufactured by Rheometrics, Inc.), a test piece of a length of 50 mm, a width of 12.7 mm and a thickness of 2 mm for tan δ at 0° C. under conditions of a dynamic strain of 0.5% and a frequency of 10 Hz. This property was indicated by an index calculated assuming that a measured value of Comparative Example 1 corresponded to 100. As this index is larger, the wet grip property is better.

[Low Heat Buildup Property]

The low heat buildup property was evaluated by measuring, using a viscoelasticity measuring device (product name "ARES" manufactured by Rheometrics, Inc.), a test piece of a length of 50 mm, a width of 12.7 mm and a thickness of 2 mm for tan δ at 60° C. under conditions of a dynamic strain of 2.5% and a frequency of 10 Hz. This property was indicated by an index calculated assuming that a measured value of Comparative Example 1 corresponded to 100. As this index is smaller, the low heat buildup property is better.

[Tensile Strength and Elongation at Break]

In accordance with JIS K6251, a tensile test was performed using a No. 3 dumbbell test piece so as to measure the tensile strength and the elongation at break. Each of these properties was indicated by an index calculated assuming that a measured value of Comparative Example 1 corresponded to 100. As these indexes are larger, the tensile strength and the elongation at break are better.

Production Example 1: Production of Polymerization Initiator 1 (Lithiation of 1,3,5-Trimethylbenzene)

Under a nitrogen atmosphere, a glass reaction vessel was charged with 16 parts of cyclohexane, 0.841 part of 1,3,5-trimethylbenzene, and 0.813 part of tetramethylethylenediamine. Next, 1.345 parts of n-butyllithium (in an amount giving 0.3 mole of tetramethylethylenediamine with respect to 1 mole of n-butyllithium) was added thereto under stirring, and the resultant was allowed to stand still for a reaction at a reaction temperature of 60° C. for 2 days, and thus, 18.999 parts of a solution of a polymerization initiator 1 (that is, lithiated 1,3,5-trimethylbenzene) was obtained. Next, for the purpose of measuring a lithiation rate of lithiated 1,3,5-trimethylbenzene thus obtained by the reaction, several drops of the obtained reaction solution were added to a glass container to which an excessive amount of trimethylsilyl chloride had been added, and the resultant was allowed to react for 30 minutes. Tap water was used to extract and wash a catalyst residue, then the solvent was distilled off to obtain a yellow oily liquid.

The thus obtained yellow oily liquid was subjected to gas chromatography mass spectroscopy (GC-MS). The result was as follows:

EI-MS, m/z=120 (M+) (3%), m/z=192 (M+) (3%), m/z=264 (M+) (24%), m/z=336 (M+) (70%). Mw=120 (3%), Mw=192 (3%), Mw=264 (24%), Mw=336 (70%).

Next, the yellow oily liquid was subjected to $^1$H-NMR measurement. The result was as follows:

$^1$H-NMR (CDCl$_3$) 6.83 (s, 3H, Ph-H), 6.73 (s, 1H, Ph-H), 6.64 (s, 2H, Ph-H), 6.55 (s, 2H, Ph-H), 6.47 (s, 1H, Ph-H), 6.39 (s, 3H, Ph-H), 2.30 (s, 9H, Ph-CH$_3$), 2.28 (s, 6H, Ph-CH$_3$), 2.02 (s, 2H, Ph-CH$_2$—SiMe$_3$), 2.26 (s, 3H, Ph-CH$_3$), 2.00 (s, 4H, Ph-CH$_2$—SiMe$_3$), 1.98 (s, 6H, Ph-CH$_2$—SiMe$_3$).

Besides, $^1$H-detected multi-bond heteronuclear multiple quantum coherence spectrum-NMR (NMBC-HMR) measurement was performed for attribution of signals in the resultant $^1$H-NMR spectrum. The results are as follows.

Non-substituted compound (1,3,5-trimethylbenzene)$^1$H-NMR (CDCl$_3$): 6.83 (s, 3H, Ph-H), 2.30 (s, 9H, Ph-CH$_3$), monosubstituted compound (1-trimethylsilylmethyl-3,5-dimethylbenzene)$^1$H-NMR (CDCl$_3$): 6.73 (s, 1H, Ph-H), 6.64 (s, 2H, Ph-H), 2.28 (s, 6H, Ph-CH$_3$), 2.02 (s, 2H, Ph-CH$_2$—SiMe$_3$), disubstituted compound (1, 3-bis(trimethylsilylmethyl)-5-methylbenzene) $^1$H-NMR (CDCl$_3$): 6.55 (s, 2H, Ph-H), 6.47 (s, 1H, Ph-H), 2.26 (s, 3H, Ph-CH$_3$), 2.00 (s, 4H, Ph-CH$_2$—SiMe$_3$), trisubstituted compound (1, 3, 5-tris (trimethylsilylmethyl)benzene)$^1$H-NMR (CDCl$_3$): 6.39 (s, 3H, Ph-H), 1.98 (s, 6H, Ph-CH$_2$—SiMe$_3$)

On the basis of the attribution obtained by the $^1$H-NMR and HMBC-NMR measurement, molecular ion peaks obtained by the GC-MS were attributed as follows: In EI-MS, a peak at m/z=120(M+) corresponded to a non-substituted compound (1,3,5-trimethylbenzene), a peak at m/z=192(M+) corresponded to a monosubstituted compound (1-trimethylsilylmethyl-3,5-dimethylbenzene), a peak at m/z=264(M+) corresponded to a disubstituted compound (1,3-bis(trimethylsilylmethyl)-5-methylbenzene), and a peak at m/z=336(M+) corresponded to a trisubstituted compound (1,3,5-tris(trimethylsilylmethyl)benzene). On the basis of these results, a ratio (a molar ratio) of non-substituted compound:monosubstituted compound:disubstituted compound:trisubstituted compound was found to be 3:3:27:67, a lithiation rate of a methyl group of 1,3,5-trimethylbenzene was 87%, and the average number of lithium atoms introduced into one molecule of 1,3,5-trimethylbenzene was 2.44.

Example 1

[Production of Modified Styrene-butadiene Rubber 1]

Under a nitrogen atmosphere, an autoclave was charged with 800 parts of cyclohexane, 94.8 parts of 1,3-butadiene, 25.2 parts of styrene, and 0.185 part of tetramethylethylenediamine, and then 0.812 part of a solution of the polymerization initiator 1 (lithiated 1,3,5-trimethylbenzene) obtained in Production Example 1 was added thereto (an amount of tetramethylethylenediamine present in the reaction system was 2.0 moles with respect to 1 mole of n-butyllithium used in the lithiation of 1,3,5-trimethylbenzene), and polymerization was started at 60° C. The polymerization reaction was continued for 60 minutes, and after confirming that a polymerization conversion rate reached a range of 95% to 100%, 0.051 part of propylene oxide (an activity control agent) was added thereto, followed by performing a reaction for 15 minutes. Besides, 0.306 part of chloromethyltriisopropoxysilane (a modifier) was added thereto, followed by performing a reaction for 30 minutes, then 0.064 part of methanol was added thereto as a polymerization terminator, and thus, a solution containing a polymer was obtained.

Then, 0.15 part of 2,4-bis[(octylthio)methyl]-o-cresol (product name "Irganox 1520" manufactured by Ciba Specialty Chemicals) with respect to 100 parts of the thus obtained polymer was added, as an antioxidant, to the solution containing the polymer, and thereafter, the solvent was removed by steam stripping, the resultant was dried under vacuum at 60° C. for 24 hours, and thus, modified styrene-butadiene rubber 1 in a solid form was obtained.

The thus obtained modified styrene-butadiene rubber 1 was subjected to the GPC measurement, and was found to contain an eluted component (having a peak area ratio of 22.0%) with Mn of 172,000, Mw of 222,000 and a molecular weight distribution (Mw/Mn) of 1.29, an eluted component (having a peak area ratio of 38.5%) with Mn of 396,000, Mw of 400,000 and a molecular weight distribution (Mw/Mn) of 1.01, and an eluted component (having a peak area ratio of 39.5%) with Mn of 748,000, Mw of 785,000 and a molecular weight distribution (Mw/Mn) of 1.05, and was found to have Mn of 428,000, Mw of 599,000 and a molecular weight distribution (Mw/Mn) of 1.40 as a whole. Besides, the rubber was subjected to multiangle light scattering measurement, and was found to have a higher branching degree of peaks on the high molecular weight side. Furthermore, a styrene content of the modified styrene-butadiene rubber 1 was 21.7 mol %, and a vinyl bond content in a butadiene unit was 59.8 mol %. Besides, the modified styrene-butadiene rubber 1 was subjected to the $^1$H-NMR measurement to find that a methyltriisopropoxysilane group had been introduced thereto. The modified styrene-butadiene rubber 1 was subjected to the gel weight ratio measurement by the aforementioned method. The result is shown in Table 1.

[Preparation of Rubber Composition]

Next, in a Brabender type mixer having a capacity of 250 ml, 100 parts of the modified styrene-butadiene rubber 1 obtained as described above was masticated for 30 seconds, subsequently, 50 parts of silica (product name "Zeosil 1165MP" manufactured by Rhodia), 25 parts of a process oil (product name "Aromax T-DAE" manufactured by Nippon Oil Corporation), and 5.6 parts of a silane coupling agent of bis(3-(triethoxysilyl)propyl)tetrasulfide (product name "Si69" manufactured by Degussa) were added thereto, and the resultant was kneaded with a starting temperature set to 110° C. for 1.5 minute. Then, 20 parts of silica (product name "Zeosil 1165MP" manufactured by Rhodia), 3 parts of zinc oxide, 2 parts of stearic acid and 2 parts of an antioxidant of N-phenyl-N'-(1,3-dimethylbutyl)-p-phenylenediamine (product name "Nocrac 6C" manufactured by Ouchi Shinko Chemical Industrial Co., Ltd.) were added thereto, and the resultant was kneaded for another 2.5 minutes, and then, the thus obtained kneaded product was discharged from the mixer. The temperature of the kneaded product at the end of the kneading was 150° C. The kneaded product was cooled down to room temperature, then was again kneaded in a Brabender type mixer with a starting temperature set to 110° C. for 2 minutes, and then the kneaded product was discharged from the mixer. Next, an open roll was used at 50° C. to knead the thus obtained kneaded product, 1.5 parts of sulfur, 1.8 parts of a cross-linking accelerator of N-cyclohexyl-2-benzothiazolylsulfenamide (product name "Nocceler CZ-G" manufactured by Ouchi Shinko Chemical Industrial Co., Ltd.) and 1.5 parts of another cross-linking accelerator of diphenylguanidine (product name "Nocceler D" manufactured by Ouchi Shinko Chemical Industrial Co., Ltd.), and then a sheet-shaped rubber composition was taken out. Then, the thus obtained rubber composition was cross-linked by pressing at 160° C. for 20 minutes to prepare a cross-linked rubber, and the thus obtained cross-liked rubber (test piece) was evaluated for the wet grip property, the low heat buildup property, the tensile strength and the elongation at break. The results are shown in Table 1. Note that, Table 1 shows the evaluation results of the wet grip property, the low heat buildup property, the tensile strength and the elongation at break each as a ratio calculated assuming that a result of Comparative Example 1 described later corresponded to 100.

Example 2

[Production of Modified Styrene-butadiene Rubber 2]

A modified styrene-butadiene rubber 2 was produced in the same manner as in Example 1 except that 0.200 part of chloromethylisopropoxydimethylsilane was used as a modifier instead of 0.306 part of chloromethyltriisopropoxysilane. The thus obtained modified styrene-butadiene rubber 2 was subjected to the GPC measurement, and was found to contain an eluted component (having a peak area ratio of 14.4%) with Mn of 151,000, Mw of 192,000 and a molecular weight distribution (Mw/Mn) of 1.27, an eluted component (having a peak area ratio of 17.3%) with Mn of 361,000, Mw of 374,000 and a molecular weight distribution (Mw/Mn) of 1.03, and an eluted component (having a peak area ratio of 68.3%) with Mn of 742,000, Mw of 753,000 and a molecular weight distribution (Mw/Mn) of 1.01, and was found to have Mn of 444,000, Mw of 641,000 and a molecular weight distribution (Mw/Mn) of 1.44 as a whole. Besides, the rubber was subjected to the multiangle light scattering measurement, and was found to have a higher branching degree of peaks on the high molecular weight side. Furthermore, a styrene content of the modified styrene-butadiene rubber 2 was 22.4 mol %, and a vinyl bond content in a butadiene unit was 60.1 mol %. Besides, the modified styrene-butadiene rubber 2 was subjected to the $^1$H-NMR measurement to find that a methylisopropoxydimethylsilane group had been introduced thereto. The modified styrene-butadiene rubber 2 was subjected to the gel weight ratio measurement by the aforementioned method. The result is shown in Table 1.

Subsequently, a rubber composition and a cross-linked rubber were obtained in the same manner as in Example 1 except that the modified styrene-butadiene rubber 2 obtained as described above was used instead of the modified styrene-butadiene rubber 1, and were evaluated in the same manner as in Example 1. The results are shown in Table 1.

Example 3

A modified styrene-butadiene rubber 3 was produced in the same manner as in Example 1 except that 0.255 part of chloromethyltriethoxysilane was used as a modifier instead of 0.306 part of chloromethyltriisopropoxysilane. The thus obtained modified styrene-butadiene rubber 3 was subjected to the GPC measurement, and was found to contain an eluted component (having a peak area ratio of 14.1%) with Mn of 158,000, Mw of 210,000 and a molecular weight distribution (Mw/Mn) of 1.33, an eluted component (having a peak area ratio of 15.9%) with Mn of 394,000, Mw of 398,000 and a molecular weight distribution (Mw/Mn) of 1.01, and an eluted component (having a peak area ratio of 70.0%) with Mn of 738,000, Mw of 783,000 and a molecular weight distribution (Mw/Mn) of 1.06, and was found to have Mn of 432,000, Mw of 619,000 and a molecular weight distribution (Mw/Mn) of 1.43 as a whole. Besides, the rubber was subjected to the multiangle light scattering measurement, and was found to have a higher branching degree of peaks on the high molecular weight side. Furthermore, a styrene content of the modified styrene-butadiene rubber 3 was 21.5 mol %, and a vinyl bond content in a butadiene unit was 60.3 mol %. Besides, the modified styrene-butadiene rubber 3 was subjected to the $^1$H-NMR measurement to find that a methyltriethoxysilane group had been introduced thereto. The modified styrene-butadiene rubber 3 was subjected to the gel weight ratio measurement by the aforementioned method. The result is shown in Table 1.

Subsequently, a rubber composition and a cross-linked rubber were obtained in the same manner as in Example 1 except that the modified styrene-butadiene rubber 3 obtained as described above was used instead of the modified styrene-butadiene rubber 1, and were evaluated in the same manner as in Example 1. The results are shown in Table 1.

Comparative Example 1

A modified styrene-butadiene rubber 4 was produced in the same manner as in Example 1 except that the reaction with the activity control agent of propylene oxide was not performed, and that 0.260 part of polyorganosiloxane represented by the following formula (12) was used in the form of a xylene solution in a concentration of 22% as a modifier instead of 0.306 part of chloromethyltriisopropoxysilane. The thus obtained modified styrene-butadiene rubber 4 was subjected to the GPC measurement, and was found to contain an eluted component (having a peak area ratio of 15.5%) with Mn of 166,000, Mw of 207,000 and a molecular weight distribution (Mw/Mn) of 1.25, an eluted component (having a peak area ratio of 14.3%) with Mn of 377,000, Mw of 381,000 and a molecular weight distribution (Mw/Mn) of 1.01, and an eluted component (having a peak area ratio of 70.2%) with Mn of 726,000, Mw of 769,000 and a molecular weight distribution (Mw/Mn) of 1.06, and was found to have Mn of 438,000, Mw of 626,000 and a molecular weight distribution (Mw/Mn) of 1.43 as a whole. Besides, the rubber was subjected to the multiangle light scattering measurement, and was found to have a higher branching degree of peaks on the high molecular weight side. Furthermore, a styrene content of the modified styrene-butadiene rubber 4 was 21.5 mol %, and a vinyl bond content in a butadiene unit was 59.6 mol %. Besides, the modified styrene-butadiene rubber 4 was subjected to the $^1$H-NMR measurement to find that a siloxane group had been introduced thereto. The modified styrene-butadiene rubber 4 was subjected to the gel weight fraction measurement by the aforementioned method. The result is shown in Table 1.

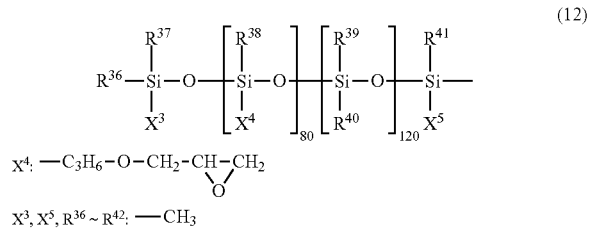

(12)

Subsequently, a rubber composition and a cross-linked rubber were obtained in the same manner as in Example 1 except that the modified styrene-butadiene rubber 4 obtained as described above was used instead of the modified styrene-butadiene rubber 1, and were evaluated in the same manner as in Example 1. The results are shown in Table 1.

Comparative Example 2

A modified styrene-butadiene rubber 5 was produced in the same manner as in Example 1 except that the reaction with the activity control agent of propylene oxide was not performed. The thus obtained modified styrene-butadiene rubber 5 was subjected to the GPC measurement, and was found to contain an eluted component (having a peak area ratio of 14.2%) with Mn of 175,000, Mw of 219,000 and a molecular weight distribution (Mw/Mn) of 1.25, an eluted component (having a peak area ratio of 8.4%) with Mn of 390,000, Mw of 394,000 and a molecular weight distribution (Mw/Mn) of 1.01, an eluted component (having a peak area ratio of 51.6%) with Mn of 773,000, Mw of 818,000 and a molecular weight distribution (Mw/Mn) of 1.06, and an eluted component (having a peak area ratio of 25.8%) with Mn of 1,810,000, Mw of 2,005,000 and a molecular weight distribution (Mw/Mn) of 1.11, and was found to have Mn of 545,000, Mw of 1,004,000 and a molecular weight distribution (Mw/Mn) of 1.84 as a whole. Besides, the rubber was subjected to the multiangle light scattering measurement, and was found to have a higher branching degree of peaks on the high molecular weight side. Furthermore, a styrene content of the modified styrene-butadiene rubber 5 was 21.9 mol %, and a vinyl bond content in a butadiene unit was 62.0 mol %. Besides, the modified styrene-butadiene rubber 5 was subjected to the $^1$H-NMR measurement to find that a methyltriisopropoxysilane group had been introduced thereto. The modified styrene-butadiene rubber 5 was subjected to the gel weight ratio measurement by the aforementioned method. The result is shown in Table 1.

Subsequently, a rubber composition and a cross-linked rubber were obtained in the same manner as in Example 1 except that the modified styrene-butadiene rubber 5 obtained as described above was used instead of the modified styrene-butadiene rubber 1, and were evaluated in the same manner as in Example 1. The results are shown in Table 1.

Comparative Example 3

Under a nitrogen atmosphere, an autoclave was charged with 800 parts of cyclohexane, 94.8 parts of 1,3-butadiene, 25.2 parts of styrene, and 0.232 part of tetramethylethylenediamine, and then 0.051 part of n-butyllithium was added thereto, and polymerization was started at 60° C. The polymerization reaction was continued for 60 minutes, and after confirming that a polymerization conversion rate reached a range of 95% to 100%, 0.051 part of propylene oxide (an activity control agent) was added thereto, followed by performing a reaction for 15 minutes. Besides, 0.306 part of chloromethyltriisopropoxysilane (a modifier) was added thereto, followed by performing a reaction for 30 minutes, then 0.064 part of methanol was added thereto as a polymerization terminator, and thus, a solution containing a polymer was obtained. Then, 0.15 parts of 2,4-bis[(octylthio)methyl]-o-cresol (product name "Irganox 1520" manufactured by Ciba Specialty Chemicals) with respect to 100 parts of the thus obtained polymer component was added, as an antioxidant, to the solution, and thereafter, the solvent was removed by the steam stripping, the resultant was dried under vacuum at 60° C. for 24 hours, and thus, modified styrene-butadiene rubber 6 in a solid form was obtained. The thus obtained modified styrene-butadiene rubber 6 was subjected to the GPC measurement, and was found to have Mn of 209,000, Mw of 215,000 and a molecular weight distribution (Mw/Mn) of 1.03. Furthermore, a styrene content of the modified styrene-butadiene rubber 6 was 21.4 mol %, and a vinyl bond content in a butadiene unit was 59.9 mol %. Besides, the modified styrene-butadiene rubber 6 was subjected to the $^1$H-NMR measurement to find that a methyltriisopropoxysilane group had been introduced thereto. The modified styrene-butadiene rubber 6 was subjected to the gel weight ratio measurement by the aforementioned method. The result is shown in Table 1.

Subsequently, a rubber composition and a cross-linked rubber were obtained in the same manner as in Example 1 except that the modified styrene-butadiene rubber 6 obtained as described above was used instead of the modified styrene-butadiene rubber 1, and were evaluated in the same manner as in Example 1. The results are shown in Table 1.

Comparative Example 4

A modified styrene-butadiene rubber 7 was produced in the same manner as in Example 1 except that 0.087 part of trimethylchlorosilane was used as a modifier instead of 0.306 part of chloromethyltriisopropoxysilane. The thus obtained modified styrene-butadiene rubber 7 was subjected to the GPC measurement, and was found to contain an eluted component (having a peak area ratio of 16.2%) with Mn of 169,000, Mw of 210,000 and a molecular weight distribution (Mw/Mn) of 1.24, an eluted component (having a peak area ratio of 11.8%) with Mn of 376,000, Mw of 380,000 and a molecular weight distribution (Mw/Mn) of 1.01, and an eluted component (having a peak area ratio of 72.0%)

with Mn of 723,000, Mw of 764,000 and a molecular weight distribution (Mw/Mn) of 1.06, and was found to have Mn of 440,000, Mw of 629,000 and a molecular weight distribution (Mw/Mn) of 1.43 as a whole. Besides, the rubber was subjected to the multiangle light scattering measurement, and was found to have a higher branching degree of peaks on the high molecular weight side. Furthermore, a styrene content of the modified styrene-butadiene rubber 7 was 22.3 mol %, and a vinyl bond content in a butadiene unit was 60.0 mol %. Besides, the modified styrene-butadiene rubber 7 was subjected to the $^1$H-NMR measurement to find that a trimethylsilane group had been introduced thereto. The modified styrene-butadiene rubber 7 was subjected to the gel weight ratio measurement by the aforementioned method. The result is shown in Table 1.

on the high molecular weight side. Furthermore, a styrene content of the modified styrene-butadiene rubber 8 was 22.3 mol %, and a vinyl bond content in a butadiene unit was 60.0 mol %. Besides, the modified styrene-butadiene rubber 8 was subjected to the $^1$H-NMR measurement to find that a tris(dimethylamino)silane group had been introduced thereto. The modified styrene-butadiene rubber 8 was subjected to the gel weight ratio measurement by the aforementioned method. The result is shown in Table 1.

Subsequently, a rubber composition and a cross-linked rubber were obtained in the same manner as in Example 1 except that the modified styrene-butadiene rubber 8 obtained as described above was used instead of the modified styrene-butadiene rubber 1, and were evaluated in the same manner as in Example 1. The results are shown in Table 1.

TABLE 1

| | Polymerization Initiator | Reaction with Activity Control Agent before Modification | Type of Modifier | Gel Weight Ratio (%) | Wet Grip Property | Low Heat Buildup Property | Tensile Strength | Elongation at Break |
|---|---|---|---|---|---|---|---|---|
| Example 1 | Lithiated 1,3,5-trimethylbenzene | performed | Chloromethyltriisopropoxysilane | 0 | 118 | 97 | 107 | 108 |
| Example 2 | Lithiated 1,3,5-trimethylbenzene | performed | Chloromethylisopropoxydimethylsilane | 0 | 110 | 99 | 102 | 106 |
| Example 3 | Lithiated 1,3,5-trimethylbenzene | performed | Chloromethyltriethoxysilane | 0 | 120 | 95 | 103 | 102 |
| Comparative Example 1 | Lithiated 1,3,5-trimethylbenzene | not performed | Polyorganosiloxane | 18 | 100 | 100 | 100 | 100 |
| Comparative Example 2 | Lithiated 1,3,5-trimethylbenzene | not performed | Chloromethyltriisopropoxysilane | 55 | 110 | 93 | 60 | 64 |
| Comparative Example 3 | n-Butyllithium | performed | Chloromethyltriisopropoxysilane | 0 | 78 | 114 | 79 | 77 |
| Comparative Example 4 | Lithiated 1,3,5-trimethylbenzene | performed | Trimethylchlorosilane | 0 | 93 | 93 | 89 | 93 |
| Comparative Example 5 | Lithiated 1,3,5-trimethylbenzene | not performed | Tris(dimethylamino)chlorosilane | 0 | 104 | 97 | 90 | 86 |

Subsequently, a rubber composition and a cross-linked rubber were obtained in the same manner as in Example 1 except that the modified styrene-butadiene rubber 7 obtained as described above was used instead of the modified styrene-butadiene rubber 1, and were evaluated in the same manner as in Example 1. The results are shown in Table 1.

Comparative Example 5

A modified styrene-butadiene rubber 8 was produced in the same manner as in Example 1 except that the reaction with the activity control agent of propylene oxide was not performed, and that 0.157 part of tris(dimethylamino)chlorosilane was used as a modifier instead of 0.306 part of chloromethyltriisopropoxysilane. The thus obtained modified styrene-butadiene rubber 8 was subjected to the GPC measurement, and was found to contain an eluted component (having a peak area ratio of 15.2%) with Mn of 164,000, Mw of 207,000 and a molecular weight distribution (Mw/Mn) of 1.27, an eluted component (having a peak area ratio of 14.6%) with Mn of 381,000, Mw of 386,000 and a molecular weight distribution (Mw/Mn) of 1.01, and an eluted component (having a peak area ratio of 70.2%) with Mn of 741,000, Mw of 784,000 and a molecular weight distribution (Mw/Mn) of 1.06, and was found to have Mn of 443,000, Mw of 638,000 and a molecular weight distribution (Mw/Mn) of 1.44 as a whole. Besides, the rubber was subjected to the multiangle light scattering measurement, and was found to have a higher branching degree of peaks From Table 1, when the alkali metal-reacted aromatic compound, which was obtained by causing the aromatic compound having three or more carbon atoms directly bonded to an aromatic ring in one molecule to react with the alkali metal atom, was used as a polymerization initiator, and the activity control agent was reacted before modifying the active end and was subsequently reacted with the modifier having an alkoxy group and a halogen atom-containing group, the modified conjugated diene rubber thus obtained substantially contained no gelled portion, and in addition, the cross-linked rubber obtained by using this rubber was excellent in the tensile strength, the elongation at break, the low heat buildup property and the wet grip property (Examples 1 to 3).

On the contrary, when the activity control agent was not reacted, the thus obtained modified conjugated diene rubber contained a large amount of a gelled portion, and hence was poor in the processability, and besides, the cross-linked rubber obtained by using this rubber was poor in the tensile strength and the elongation at break (Comparative Examples 1 and 2).

When n-butyllithium was used as the polymerization initiator, the resultant cross-linked rubber was poor in all of the tensile strength, the elongation at break, the low heat buildup property and the wet grip property (Comparative Example 3).

Besides, when a modifier not having an alkoxy group was used for the modification although the activity control agent was reacted before modifying the active end, the resultant cross-linked rubber was poor in the tensile strength, the elongation at break and the wet grip property (Comparative Example 4).

Furthermore, when a modifier having an amino group was used for the modification, the resultant cross-linked rubber was insufficient in the wet grip property and was poor in the tensile strength and the elongation at break (Comparative Example 5).

The invention claimed is:

1. A method of production of a modified conjugated diene rubber, comprising:
    a first step of causing an aromatic compound having three or more carbon atoms directly bonded to an aromatic ring that forms the aromatic compound to react with an alkali metal compound so as to obtain an alkali metal-reacted aromatic compound;
    a second step of polymerizing a monomer at least containing a conjugated diene compound by using the alkali metal-reacted aromatic compound so as to obtain a conjugated diene rubber having an active end;
    a third step of causing the active end of the conjugated diene rubber having an active end to react with an activity control agent so as to obtain a conjugated diene rubber reacted with an activity control agent; and
    a fourth step of causing the active end of the conjugated diene rubber reacted with an activity control agent to react with a modifier having an alkoxy group and a halogen atom-containing group so as to obtain a modified conjugated diene rubber,
    wherein the activity control agent is a compound represented by the following general formula (3) and/or (4):

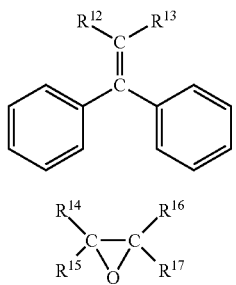

wherein each of $R^{12}$ and $R^{13}$ in the general formula (3) independently represents a hydrogen atom or a $C_1$ to $C_{10}$ alkyl group; and each of $R^{14}$ to $R^{17}$ in the general formula (4) independently represents a hydrogen atom or a $C_1$ to $C_{12}$ alkyl group.

2. The method of production of a modified conjugated diene rubber according to claim 1, wherein the aromatic compound having three or more carbon atoms directly bonded to an aromatic ring that forms the aromatic compound is a compound represented by the following general formula (1):

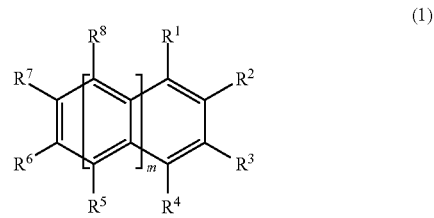

wherein, in the general formula (1), each of $R^1$ to $R^8$ independently represents a hydrogen atom or a $C_1$ to $C_{10}$ alkyl group, and three or more of $R^1$ to $R^8$ are a $C_1$ to $C_{10}$ alkyl group; and "m" is an integer of 0 to 5, and when "m" is 2 or more, three or more benzene rings present therein may be condensed with one another in arbitrary position regardless of the structure represented by the general formula (1).

3. The method of production of a modified conjugated diene rubber according to claim 1, wherein the modifier is a compound represented by the following general formula (2):

wherein, in the general formula (2), $X^1$ represents a group represented by $X^2$ or $R^{11}X^2$, wherein $X^2$ represents a halogen atom, and $R^{11}$ represents a $C_1$ to $C_4$ alkylene group; each of $R^9$ and $R^{10}$ independently represents a $C_1$ to $C_{10}$ alkyl group; and "n" is an integer of 1 to 3.

4. The method of production of modified conjugated diene rubber according to claim 1, wherein the activity control agent is ethylene oxide and/or propylene oxide.

5. A modified conjugated diene rubber obtained by the method of production according to claim 1.

6. A rubber composition comprising:
    100 parts by weight of a rubber ingredient containing the modified conjugated diene rubber according to claim 5; and
    10 to 200 parts by weight of silica.

7. The rubber composition according to claim 6, further comprising a cross-linking agent.

8. A cross-linked rubber obtained by cross-linking the rubber composition according to claim 7.

9. A tire comprising the cross-linked rubber according to claim 8.

* * * * *